(12) United States Patent
Mitomi et al.

(10) Patent No.: US 8,607,916 B2
(45) Date of Patent: Dec. 17, 2013

(54) VEHICLE SHROUD

(75) Inventors: Takane Mitomi, Tokyo (JP); Satoshi Oohashi, Shizuoka-ken (JP); Takayoshi Muramatsu, Shizuoka-Ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 387 days.

(21) Appl. No.: 12/656,136

(22) Filed: Jan. 19, 2010

(65) Prior Publication Data
US 2010/0181131 A1 Jul. 22, 2010

(30) Foreign Application Priority Data

Jan. 20, 2009 (JP) ................... 2009-009435

(51) Int. Cl.
*B62D 61/02* (2006.01)
(52) U.S. Cl.
USPC ......................... 180/229; 180/68.1
(58) Field of Classification Search
USPC ..................... 180/229, 68.4, 68.6, 68.1, 68.3; 296/181.5, 181.1, 192, 193.05, 33, 296/78.1
See application file for complete search history.

(56) References Cited

U.S. PATENT DOCUMENTS

| | | | | |
|---|---|---|---|---|
| 6,651,769 B2 * | 11/2003 | Laivins et al. | ................ | 180/229 |
| 6,655,486 B2 * | 12/2003 | Oshikawa et al. | ........... | 180/68.1 |
| 7,445,070 B1 * | 11/2008 | Pickering | ...................... | 180/211 |
| 7,537,077 B2 * | 5/2009 | Nakashima et al. | .......... | 180/229 |
| 7,654,357 B2 * | 2/2010 | Buell et al. | ...................... | 180/229 |
| 7,686,116 B2 * | 3/2010 | Oohashi et al. | ............... | 180/219 |
| 7,850,221 B2 * | 12/2010 | Nakata et al. | ................. | 296/78.1 |
| 2006/0000652 A1 * | 1/2006 | Yamaguchi et al. | ......... | 180/68.3 |
| 2006/0175112 A1 * | 8/2006 | Yoshida et al. | ............... | 180/229 |
| 2006/0254844 A1 * | 11/2006 | Nakashima et al. | .......... | 180/229 |
| 2008/0156566 A1 * | 7/2008 | Oohashi et al. | ............... | 180/229 |
| 2009/0008182 A1 * | 1/2009 | Buell et al. | ..................... | 180/229 |

FOREIGN PATENT DOCUMENTS

JP 2006-282050 10/2006

* cited by examiner

*Primary Examiner* — Tashiana Adams
(74) *Attorney, Agent, or Firm* — Rabin & Berdo, P.C.

(57) ABSTRACT

A vehicle shroud can have an opening formed so as to extend in a substantially front-to-rear direction. A substantially horizontal portion of a front fender of the vehicle can be located frontward of the opening. The vehicle can be a motorcycle, for example.

16 Claims, 4 Drawing Sheets

VEHICLE SHROUD

CROSS-REFERENCE TO RELATED APPLICATIONS

This application claims priority under 35 U.S.C. §119 from Japanese Patent Application No. 2009-009435, filed Jan. 20, 2009, the subject matter of which is incorporated in its entirety herein by reference.

BACKGROUND OF THE INVENTION

1. Field of the Invention

Embodiments of the present invention relate to a vehicle, and more particularly to a shroud for the vehicle. In embodiments, the vehicle can be a motorcycle.

2. Description of Related Art

Certain off-road-type motorcycles, such as motocrosser-type motorcycles, have a cover called a shroud. An example is described in JP 2006-282050 A, for instance. The shroud covers the sides of a front portion of the motorcycle, and serves to supply air flow from the front of the motorcycle to the engine. If the motorcycle has a water-cooled engine, the shroud supplies the air flow to the radiator.

SUMMARY OF THE INVENTION

Embodiments of the invention relate to a shroud for a vehicle, such as a motorcycle, that can effectively take in and discharge air to, among other things, better cool the motorcycle. A motorcycle according to embodiments of the invention can comprise a front wheel, a front fork for supporting the front wheel, an under bracket coupled to the front fork, and a steering shaft coupled to the front fork via the under bracket. The motorcycle according to the embodiments can further comprise a head pipe for rotatably supporting the steering shaft, a frame extending from the head pipe obliquely downward and rearward, as viewed from one side of the motorcycle, and a shroud in which an opening extending in a front-to-rear direction is formed. The shroud can cover a side of a portion of the frame, extend frontward, and extend outward with respect to a widthwise direction of the motorcycle.

The motorcycle can still further comprise a front fender having a horizontal portion extending substantially or approximately horizontally, as viewed from one side of the motorcycle. The front fender can be attached to the under bracket and cover a region over the front wheel. The horizontal portion of the front fender can be located frontward of the opening in the shroud.

Embodiments of the invention further relate to a vehicle shroud, comprising a first portion and a second portion framing a tapered opening. The tapered opening can be at least partly defined by opposed curved surfaces in the first and second portions, respectively. Another opening can be formed in the second portion, spaced apart from the tapered opening. When the shroud is in place on a vehicle, the first portion can be in an upper position and the second portion can be in a lower position. The tapered opening can extend from a frontward region to a rearward region relative to the vehicle, and the tapered opening can be substantially aligned with an upper portion of a fender of the vehicle. The vehicle can be a motorcycle, such as an off-road motorcycle.

Embodiments of the invention still further relate to a vehicle shroud comprising a shroud body having a branched or bifurcated opening formed therein. The branched opening can have a first branch and a second branch, the first branch being longer than the second branch. The first branch and the second branch can converge at a region of convergence in a middle part of the vehicle shroud, and separate and taper from the region of convergence toward an end of the vehicle shroud. When the shroud is in place on a vehicle, an upper edge portion of the vehicle shroud can extend substantially horizontally, and be substantially aligned with a substantially horizontal portion of a fender of the vehicle. The vehicle can be a motorcycle, for example, an off-road motorcycle.

With the above-described structures, improved handling of air flow against the front of the motorcycle can be realized. More specifically, the shroud can smoothly discharge air that has been taken inside the shroud to the outside of the shroud, and increase the amount of the air flowing from the shroud to the rear, thereby improving the cooling performance of the engine, for example. Other features, elements, steps, characteristics and advantages of the invention will become more apparent from the following detailed description of embodiments of the invention with reference to the attached drawings.

DETAILED DESCRIPTION OF THE INVENTION

Figure 1:
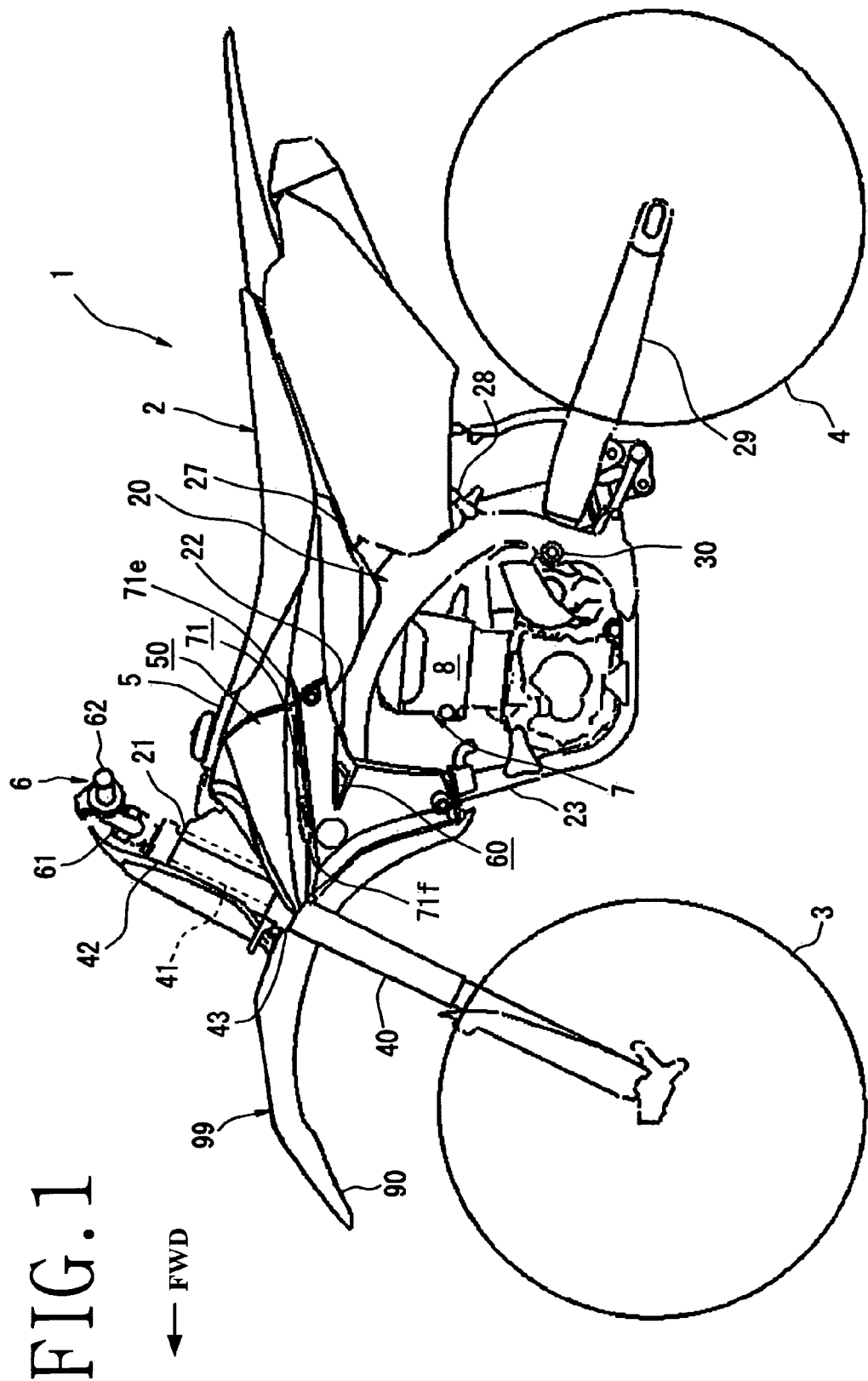
FIG. 1 is a side view illustrating a motorcycle according to a first exemplary embodiment of the invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "frontward," "ahead," "back," "rear," "rearward," "behind," "right," "left," "above," "below," "up," "upward," "down," "downward," "forward," "backward," "widthwise," "lengthwise," "horizontal" and "vertical." As used herein, these terms reflect the perspective of a person facing in the direction indicated by the arrow labeled "FWD" in the drawings, such as a rider seated on or straddling the motorcycle 1 and facing toward the front wheel 3. Thus, the arrow labeled "FWD" indicates a back-to-front direction relative to the motorcycle 1, or an advancing direction of the motorcycle 1. A direction specified as "left" or "right" in the description refers to left or right with respect to the FWD direction or a direction opposite (e.g. 180 degrees from) to the FWD direction. "Widthwise" corresponds to a direction substantially transverse to the FWD direction or to a direction opposite to the FWD direction, e.g., a left-to-right or right-to-left direction. "Lengthwise" (with respect to the motorcycle 1) corresponds substantially to the FWD direction or to a direction opposite to the FWD direction. "Vertical" refers to a direction substantially transverse to both the widthwise and lengthwise directions, and corresponds substantially to "upward" and/or "downward." "Horizontal" refers to a direction substantially transverse to the vertical direction, and corresponds substantially to the FWD direction or to a direction opposite to the FWD direction.

First Exemplary Embodiment

FIG. 1 is a left side view illustrating a motorcycle 1 according to a first exemplary embodiment. An overview of the configuration of the motorcycle 1 follows, with reference to FIG. 1.

FIG. 1 illustrates an example of what is commonly termed a "motocrosser"-type motorcycle. However, embodiments of the invention are not limited to any particular kind of motorcycle or vehicle, and could be realized, for example, in an on-road-type motorcycle, a scooter-type motorcycle, a moped-type motorcycle, or other type of motorcycle or vehicle.

The motorcycle 1 can be equipped with a vehicle body frame 20 forming a framework. The motorcycle 1 can further be equipped with a seat 2 for seating a rider, a front wheel 3, and a rear wheel 4. The front wheel 3 can be disposed at a front portion of the motorcycle 1, and be supported by a front fork 40. The front fork 40 can include a pair of left and right fork tubes, and the front wheel 3 can be disposed between the left and right fork tubes. The front fork 40 can slope rearward from a substantially vertical direction as viewed from one side of the motorcycle, and can absorb shocks from the road surface received by the front wheel 3. When absorbing a shock, the front wheel 3 can move in accordance with movements of the front fork 40.

A steering shaft 41 can be provided at substantially a central position between the left and right fork tubes of the front fork 40, as viewed from the front of the motorcycle. The steering shaft 41 can extend along a slope substantially the same as that of front fork 40, between an upper bracket 42 and an under bracket 43. The front fork 40, the upper bracket 42, and the under bracket 43 can be coupled to each other. The steering shaft 41 can be coupled to the front fork 40 via the under bracket 43 and the upper bracket 42.

The motorcycle 1 can include a head pipe 21 that rotatably supports the steering shaft 41. The vehicle body frame 20 can extend from the head pipe 21 obliquely downward and rearward, as viewed from one side of the motorcycle.

As illustrated in FIG. 1, the vehicle body frame 20 can include a main frame 22 and a down frame 23. The main frame 22 can extend from the head pipe 21 obliquely downward and rearward, as viewed from one side of the motorcycle. Below the main frame 22, the down frame 23 can extend from the head pipe 21 obliquely downward and rearward, as viewed from one side of the motorcycle.

The upper bracket 42 can be located above the head pipe 21. A steering handle 6 can be provided above the head pipe 21 and the upper bracket 42. The steering handle 6 can be coupled to the upper bracket 42. The steering handle 6 can include a handlebar 61 extending to the left and right, and handle grips 62 attached to both ends of the handlebar 61. The handlebar 61 can be coupled to the steering shaft 41 via the upper bracket 42.

In the motorcycle 1, the main frame 22 can be configured to have a pair of portions, e.g., left and right frame portions. Alternatively, the main frame 22 can comprise or be formed as a single, integral frame. A pair of left and right seat rails 27 can be connected to the main frame 22. As illustrated in FIG. 1, the seat rails 27 can extend obliquely rearward and upward. A backstay 28 can be connected to a portion of the main frame 22 that is lower than a portion thereof at which the seat rails 27 are connected. The backstay 28 can include a pair of portions, e.g., left and right portions. A rear arm 29 can be coupled to a lower end portion of the main frame 22 via a pivot shaft 30. The rear wheel 4 can be rotatably fitted to a rear end portion of the rear arm 29.

A fuel tank 5 can be mounted above the main frame 22 and the backstay 28 so as to span the main frame 22 and the backstay 28. The fuel tank 5 can be disposed rearward of the head pipe 21. The seat 2 can be provided above and to the rear of the fuel tank 5, as viewed from one side of the motorcycle.

As illustrated in FIG. 1, the motorcycle 1 can be equipped with a shroud 50. The shroud 50 can cover a side of a portion of the vehicle body frame 20, extend frontward, and extend outward in a widthwise direction of the motorcycle. The shroud 50 can include a pair of members, e.g., a left-side shroud and a right-side shroud.

An opening 71 can be formed in the shroud 50. The opening 71 can extend in a front-to-rear direction (e.g., a substantially or approximately horizontal direction with respect to the orientation of the motorcycle 1 shown in FIGS. 1 and 2). The opening 71 can extend across a portion of the main frame 22, as viewed from one side of the motorcycle, so that the portion of the main frame abuts or is adjacent to the opening 71. A size of the opening 71 along the front-to-rear direction can be larger than a size of the portion of the main frame 22 abutting or adjacent to the opening 71. Moreover, the size of the opening 71 along the front-to-rear direction can be larger than a size of the opening 71 in other directions (e.g., a substantially vertical direction).

Figure 2:
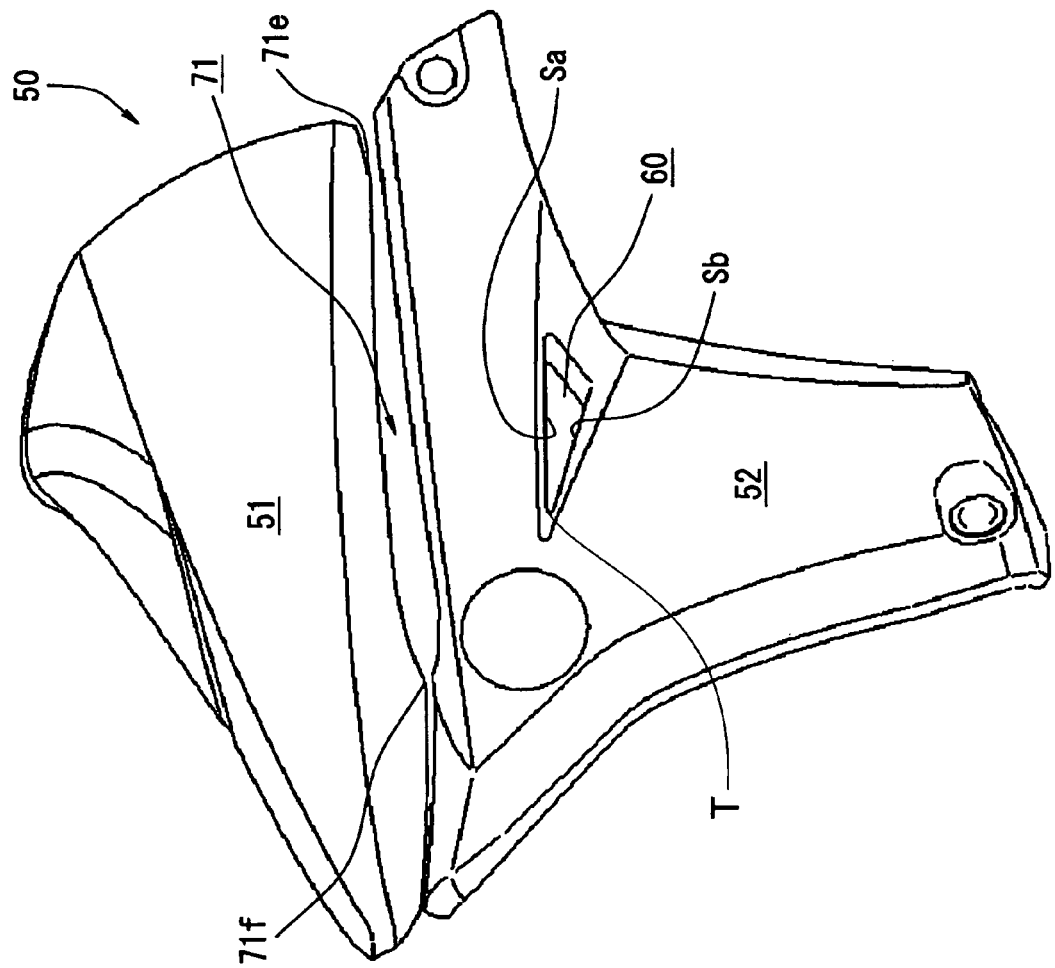
FIG. 2 is a side view illustrating a left-side shroud according the first exemplary embodiment.

As illustrated in FIG. 2, the opening 71 has a front end 71*f* and a rear end 71*e*. As illustrated in FIG. 1, the front end 71*f* of the opening 71 can be located frontward of the handle grips 62 when the front wheel 3 is positioned fully frontward. As illustrated in FIGS. 1 and 2, the rear end 71*e* of the opening 71 can be located rearward of the handle grips 62 when the front wheel 3 is positioned fully frontward. The opening 71 can be formed so as to be tapered in at least a rearward direction. Additionally, as more particularly shown in FIG. 2, the opening 71 can be formed so as to be tapered in both the frontward direction and the rearward direction, as viewed from one side of the motorcycle.

In addition to the opening 71, another opening 60 can be formed in the shroud 50. The opening 60 can extend obliquely downward and rearward in a region below the opening 71, as viewed from one side of the motorcycle. The opening 60 can have a first side Sa and a second side Sb, and can be formed in a substantially triangular shape. The first side Sa can extend from a top or front point T obliquely downward and rearward. In a region below the first side Sa, the second side Sb can extend from the top point T obliquely downward and rearward. The top point T can be located at a front end of the opening 60.

As illustrated in FIG. 2, the shroud 50 can include an upper shroud 51 and a lower shroud 52 located below the upper shroud 51. The opening 71 can be formed between the upper shroud 51 and the lower shroud 52. In other words, in the shroud 50, a gap can be formed between the upper shroud 51 and the lower shroud 52, and this gap can form the opening 71. Due to the gap, the shroud 50 can absorb dimensional errors between the upper shroud 51 and the lower shroud 52. Alternatively to including distinct upper and lower shrouds, the shroud 50 could be formed as a single integral unit with an upper portion and lower portion. Such an integrally-formed shroud could have an opening formed therein like the opening 71 discussed previously.

Put another way, the shroud 50 can comprise a first portion 51 and a second portion 52 framing a tapered opening 71. The tapered opening 71 can be at least partly defined by opposed curved surfaces in the first and second portions, respectively (e.g., a surface curving upwards in the first portion 51, opposing or adjacent to a surface curving downward in the second portion 52). Another opening 60 can be formed in the second portion 52, spaced apart from the tapered opening 71. The other opening 60 can be substantially triangular in shape, and be aligned with a substantially central portion of the tapered opening 71. When in place on a vehicle such as motorcycle 1 as shown in FIG. 1 and FIG. 2, the first portion 51 can be in an upper position and the second portion 52 can be in a lower position, and the tapered opening 71 can extend from a frontward region to a rearward region relative to the vehicle. The tapered opening can be substantially aligned with an upper portion of the fender 90 of the motorcycle 1.

As illustrated in FIG. 1, the motorcycle 1 can include a front fender 90. The front fender 90 can cover a region over the front wheel 3, and be fitted to the under bracket 43. The front fender 90 can be stationary relative the front fork 40. For example, when the front fork 40 moves to accommodate shocks, the front fender 90 may be stationary relative to the movement of the front fork 40.

The front fender 90 can include a horizontal portion 99 located frontward of the opening 71, and extend substantially or approximately horizontally, as viewed from one side of the motorcycle. The horizontal portion 99 can be disposed between the upper and lower ends of the shroud 50, e.g., downward of the upper end of the shroud 50 and upward of the lower end of the shroud 50.

The motorcycle 1 can include an engine 7. The engine 7 can include a cylinder 8. The motorcycle 1 can further include a radiator (not shown) supported by the vehicle body frame 20 and disposed, for example, inward of the shroud 50. The radiator can include a radiator tank storing a coolant for cooling the engine 7. The engine 7 is not limited to being a radiator-cooled engine. Alternatively, the engine 7 can be an air-cooled engine, e.g., cooled by flowing air or the like.

Operations and Effects

The shroud and associated structures described previously can improve air flow, and consequently, improve engine efficiency. To review, the shroud 50 in the first exemplary embodiment can cover a side of a portion of the vehicle body frame 20, extend frontward, and extend outward in a widthwise direction of the motorcycle 1. The opening 71 extending in a front-to-rear direction can be formed in the shroud 50. The front fender 90 can be fitted to the under bracket 43, and cover a region over the front wheel 3. The horizontal portion 99 of the front fender 90 can extend substantially horizontally, as viewed from one side of the motorcycle, and be located frontward of the opening 71. The described arrangement can cause air (e.g., air impinging on a front of the motorcycle 1 due to a forward motion of the motorcycle 1) taken inside the shroud 50 along the horizontal portion 99 of the front fender 90 to flow in a substantially or approximately horizontal direction. Thereafter, the air can be smoothly discharged through the opening 71. Thus, the motorcycle 1 can smoothly discharge the air that has been taken inside the shroud 50 to the outside of the shroud 50. Moreover, the smooth discharge of air can increase the amount of the air flowing from the shroud 50 to the rear, thereby improving the cooling performance of the engine 7, for example.

The size of the opening 71 of the shroud 50 along the front-to-rear direction can be relatively large, and as described previously, formed so as to extend across the main frame 22. The air taken inside the shroud 50 along the horizontal portion 99 of the front fender 90 can be smoothly discharged through the opening 71.

As additionally described previously, another opening 60 can be formed in the shroud 50. By way of the opening 60, air taken inside the shroud 50 along the horizontal portion 99 of the front fender 90 can be more smoothly discharged through the opening 71 and the opening 60. To review, the opening 60 can extend obliquely downward and rearward in a region below the opening 71. Accordingly, the sizes of the opening 71 and the opening 60 along a substantially vertical direction can increase. This can be beneficial because the larger the sizes of the opening 71 and the opening 60 are along the substantially vertical direction (put another way, the greater the respective heights of openings 71 and 60, or the wider openings 71 and 60 are in the vertical direction), the more the amount of the air flowing through the shroud 50 will be.

As further review, the motorcycle 1 can include the handlebar 61 and the handle grips 62 attached to both ends of the handlebar 61. The front end 71f of the opening 71 can be located frontward of the handle grips 62. The rear end 71e of the opening 71 can be located rearward of the handle grips 62. Thus, the size of the opening 71 along the front-to-rear direction can be made relatively large. As a result, the air taken inside the shroud 50 along the horizontal portion 99 of the front fender 90 can be smoothly discharged through the opening 71.

As additionally described previously, the opening 71 can be formed so as to be tapered rearward, as viewed from one side of the motorcycle, thereby narrowing the rearward flow of air and keeping the air flow velocity approximately constant or at least unreduced. As a result, the air taken inside the shroud 50 along the horizontal portion 99 of the front fender 90 can be smoothly discharged through the opening 71.

Second Exemplary Embodiment

In the following, a motorcycle 1 according to a second exemplary embodiment will be described. In the description, parts and components common to both the second exemplary embodiment and the first exemplary embodiment will be denoted by the same reference numerals, and further description will be omitted.

Figure 3:
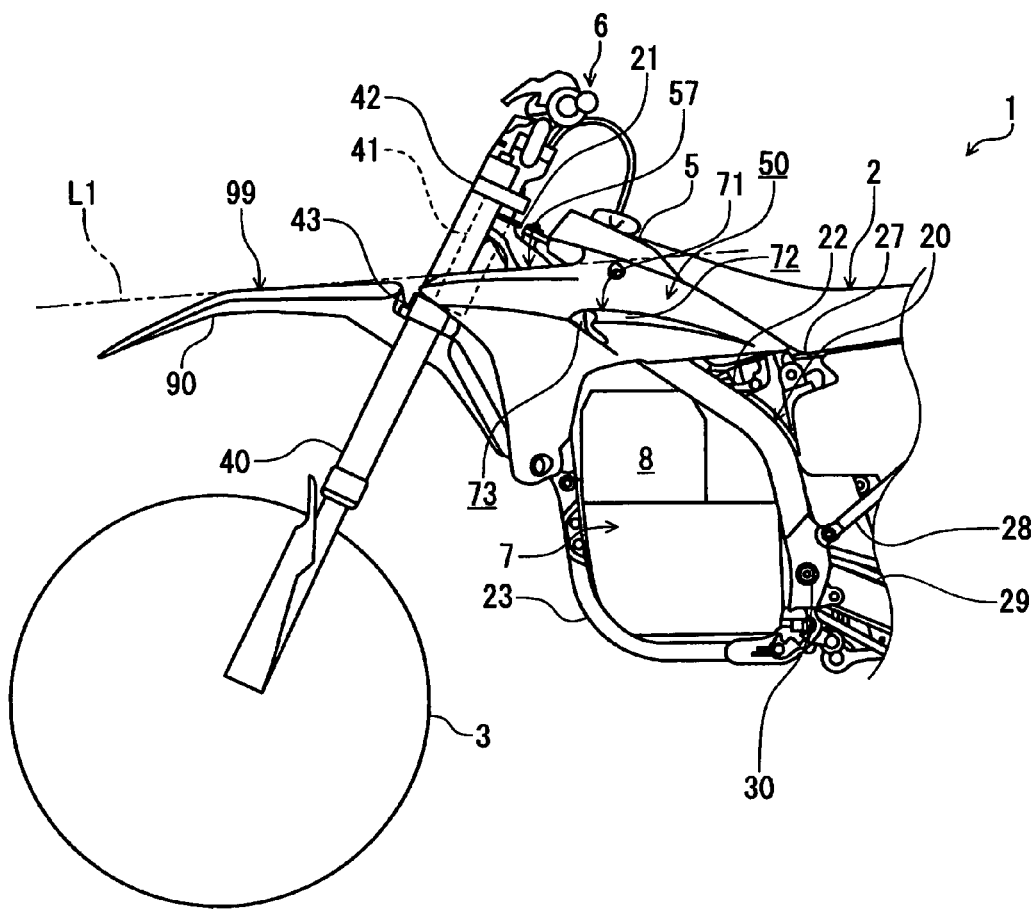
FIG. 3 is a side view illustrating a motorcycle according to a second exemplary embodiment of the invention.

As illustrated in FIG. 3, the motorcycle 1 according to the second exemplary embodiment can include a shroud 50 formed integrally as a single unit having upper and lower portions.

Figure 4:
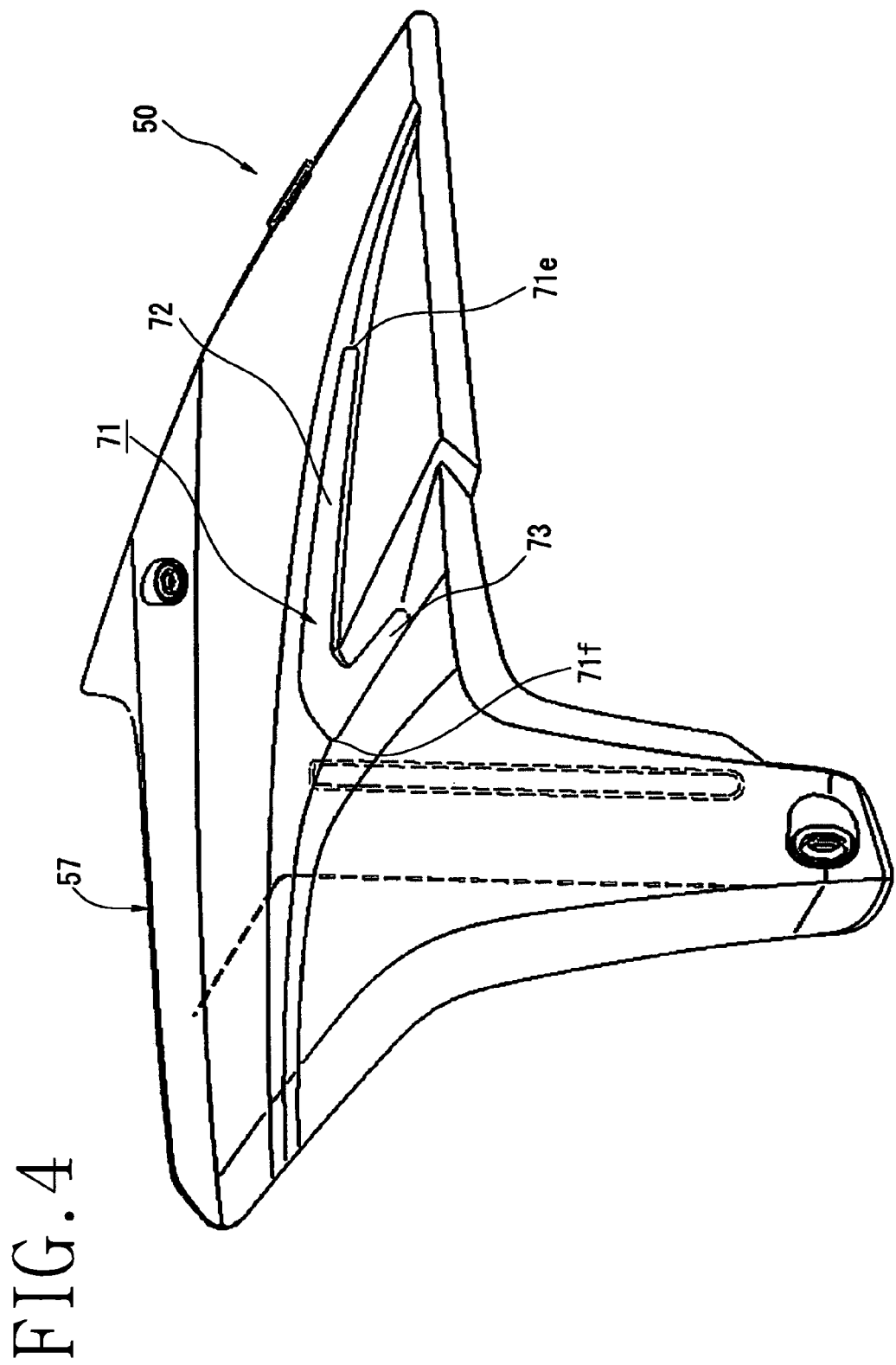
FIG. 4 is a side view illustrating a left-side shroud according to the second exemplary embodiment.

As illustrated in FIGS. 3 and 4, the shroud 50 can have an upper edge portion 57, e.g., an edge part located in an upper region of the shroud 50. The upper edge portion 57 can extend substantially or approximately horizontally, as viewed from one side of the motorcycle.

As illustrated in FIG. 4, the opening 71 can have a first opening portion 72 and a second opening portion 73. The first opening portion 72 can extend in substantially the front-to-rear direction. The second opening portion 73 can extend obliquely downward and rearward. The first opening portion 72 can be formed so as to be tapered in at least a rearward direction, and can also be tapered in a frontward direction, as viewed from one side of the motorcycle.

As illustrated in FIG. 3, the horizontal portion 99 of the front fender 90 can extend along a line L1 corresponding to a frontward extension of the upper edge portion 57 of the shroud 50, as viewed from one side of the motorcycle.

The second opening portion 73 of the opening 71 can extend obliquely downward and rearward, as viewed from one side of the motorcycle. As a result, in the shroud 50, the size of the opening 71 along the vertical direction can be made relatively large. Advantageously, the larger the size of the opening 71 along the vertical direction is (put another way, the greater the height of opening 71, or the wider opening 71 is in the vertical direction), the greater the amount of the air flowing through the shroud will be.

Put another way, the shroud 50 can comprise an integrally-formed shroud body having a branched or bifurcated opening 71 formed therein. The branched opening 71 can have a first branch 72 and a second branch 73. The first branch 72 can be longer than the second branch 73.

The first branch 72 and the second branch 73 can converge at a region of convergence in approximately a middle part of the vehicle shroud 50, and taper from the region of convergence toward an end of the vehicle shroud 50. When the vehicle shroud 50 is in place on a vehicle such as the motorcycle 1, an upper edge portion 57 of the vehicle shroud 50 can extend substantially horizontally, and be substantially aligned with a substantially horizontal portion 99 of the fender 90 of the motorcycle 1.

As described previously, the upper edge portion 57 of the shroud 50 can extend substantially horizontally, as viewed from one side of the motorcycle. This can allow the air taken inside the shroud 50 to flow toward the rear more easily. The air flowing toward the rear in the shroud 50 can be discharged through the opening 71 to the outside of the shroud 50.

As further described previously, the motorcycle 1 can discharge the air taken inside the shroud 50 smoothly through the opening 71. More specifically, in the motorcycle 1 according to the second exemplary embodiment, the shroud 50 can take the air from the front to the inside efficiently because the air taken inside the shroud 50 is discharged smoothly toward the rear. Additionally, because the horizontal portion 99 of the front fender 90 is substantially aligned with the upper edge portion 57 of the shroud 50, the shroud 50 can handle the air flowing along the horizontal portion 99 of the front fender 90 effectively. As a result, a greater amount of air can introduced inside the shroud 50.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A motorcycle comprising:
    a front wheel;
    a front fork for supporting the front wheel;
    an under bracket coupled to the front fork;
    a steering shaft coupled to the front fork via the under bracket;
    a head pipe for rotatably supporting the steering shaft;
    a body frame extending from the head pipe obliquely downward and rearward, as viewed from one side of the motorcycle;
    a shroud in which an opening extending in a front-to-rear direction is formed, the shroud covering a side of a portion of the frame, extending frontward, and extending outward in a widthwise direction of the motorcycle, wherein the shroud includes an upper piece and a lower piece, and the opening is a gap between a portion of the upper piece and a portion of the lower piece; and
    a front fender having a horizontal portion extending substantially horizontally, as viewed from one side of the motorcycle, the front fender attached to the under bracket and covering a region over the front wheel;
    wherein the horizontal portion of the front fender is located frontward of the opening; and
    wherein the opening of the shroud is formed so as to be tapered rearward, as viewed from one side of the motorcycle.

2. The motorcycle according to claim 1, wherein:
    the body frame includes a main frame extending from the head pipe obliquely downward and rearward, as viewed from one side of the motorcycle, and a down frame extending, below the main frame, from the head pipe obliquely downward and rearward, as viewed from one side of the motorcycle; and
    the opening of the shroud is formed so as to extend across the main frame, as viewed from one side of the motorcycle.

3. The motorcycle according to claim 1, wherein, in a region below the opening, another opening is formed in the shroud, the other opening extending obliquely downward and rearward, as viewed from one side of the motorcycle.

4. The motorcycle according to claim 1, further comprising:
    a handlebar coupled to the steering shaft; and
    handle grips attached to both ends of the handlebar;
    wherein, when the front wheel is in a fully frontward position, a front end of the opening of the shroud is located frontward of the handle grips, and a rear end of the opening of the shroud is located rearward of the handle grips.

5. The motorcycle according to claim 1, wherein the opening of the shroud is formed so as to have a portion extending obliquely downward and rearward, as viewed from one side of the motorcycle.

6. The motorcycle according to claim 1, wherein the shroud has an upper edge portion extending substantially horizontally as viewed from one side of the motorcycle.

7. The motorcycle according to claim 6, wherein the substantially horizontal portion of the front fender is substantially aligned with the upper edge portion of the shroud.

8. A vehicle shroud, comprising:
    a first portion and a second portion framing a tapered opening at least partly defined by opposed curved surfaces in the first and second portions, respectively, the curved surface of the first portion curving inwardly, and the curved surface of the second portion curving inwardly;
    wherein another opening is formed in the second portion, spaced apart from the tapered opening; and
    wherein the other opening is an opening through which air passes, and the other opening is aligned with a substantially central portion of the tapered opening.

9. The vehicle shroud of claim 8, wherein the other opening is substantially triangular in shape.

10. The vehicle shroud of claim 9, wherein the other opening has a first side and a second side, each extending obliquely downward and rearward from a front point when in place on a vehicle.

11. The vehicle shroud of claim 8, wherein when the vehicle shroud is in place on a vehicle, the first portion is in an upper position and the second portion is in a lower position, the tapered opening extends from a frontward region to a rearward region relative to the vehicle, and the tapered opening is substantially aligned with an upper portion of a fender of the vehicle.

12. The vehicle shroud of claim 11, wherein the vehicle is a motorcycle.

13. A vehicle shroud, comprising:
a shroud body having a branched opening formed therein, the branched opening having a first branch and a second branch, the first branch being longer than the second branch;
wherein the vehicle shroud is a motorcycle shroud; and
wherein when the vehicle shroud is in place on a vehicle, an upper edge portion of the vehicle shroud extends substantially horizontally, and is substantially aligned with a substantially horizontal portion of a fender of the vehicle.

14. The vehicle shroud of claim 13, wherein the first branch and the second branch converge at a region of convergence in approximately a middle part of the vehicle shroud, and separate and taper from the region of convergence toward an end of the vehicle shroud.

15. The vehicle shroud of claim 14, wherein when the vehicle shroud is in place on a vehicle, the first branch is above the second branch.

16. The motorcycle according to claim 1, wherein the gap separates substantially all portions of the upper piece from substantially all portions of the lower piece.

* * * * *